United States Patent [19]

Takayama et al.

[11] 4,314,150
[45] Feb. 2, 1982

[54] APPARATUS FOR DETECTING THE IN-FOCUSING CONDITIONS

[75] Inventors: Shuichi Takayama; Yoshio Nakajima; Kosaku Tsuboshima, all of Hachioji; Teruo Iwasawa, Mitaka; Masafumi Yamazaki, Okaya, all of Japan

[73] Assignee: Olympus Optical Company Limited, Tokyo, Japan

[21] Appl. No.: 90,083

[22] Filed: Oct. 31, 1979

[30] Foreign Application Priority Data

Nov. 1, 1978 [JP] Japan .............................. 53/133761

[51] Int. Cl.³ .............................................. G01J 1/20
[52] U.S. Cl. ..................................... 250/201; 250/204
[58] Field of Search ............... 250/201, 204, 208, 209, 250/578, 216; 354/25; 356/4

[56] References Cited

U.S. PATENT DOCUMENTS

| | | | |
|---|---|---|---|
| 3,857,031 | 12/1974 | Sinclair et al. | 356/4 |
| 3,967,110 | 6/1976 | Rogers et al. | 250/201 |
| 4,203,031 | 5/1980 | Kamachi et al. | 250/204 |

Primary Examiner—David C. Nelms
Attorney, Agent, or Firm—Haseltine and Lake

[57] ABSTRACT

An apparatus for detecting the in-focusing conditions for use in an optical machinery such as cameras, microscopes or endoscopes is disclosed. The apparatus comprises a light receiver arranged with an angle of inclination against an image surface of an optical system and consisting of a plurality of charge transfer elements aligned as a picture element array; means for deriving illuminance signals from the picture element array of the light receiver and means for treating the illuminance signals to detect the in-focused position of the optical system.

3 Claims, 16 Drawing Figures

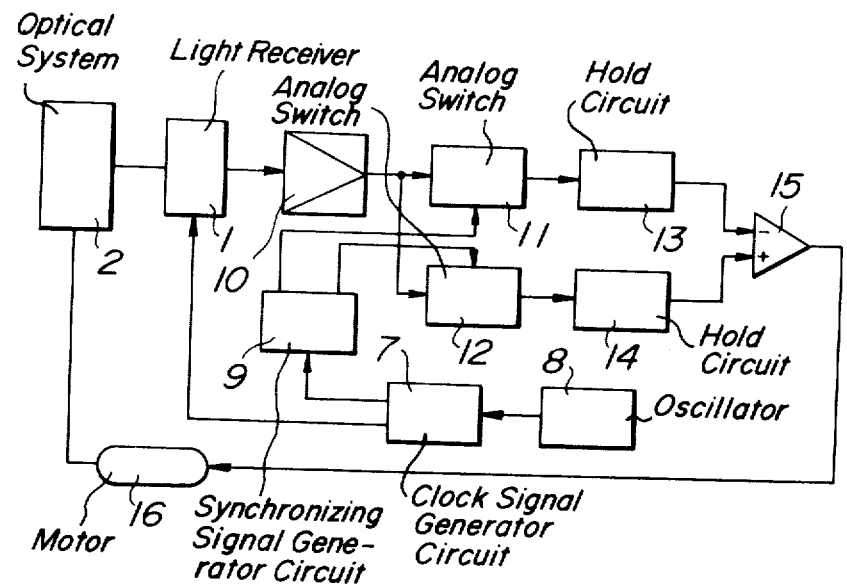
FIG._4
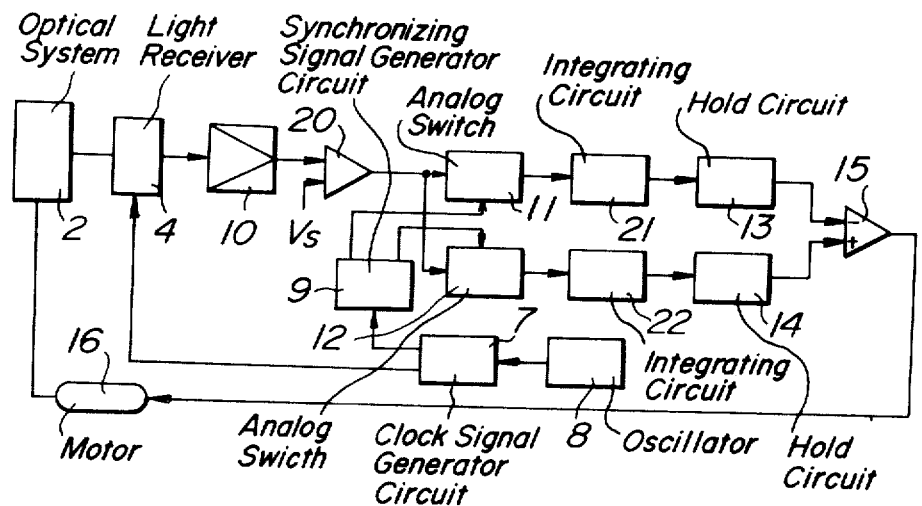
FIG._5

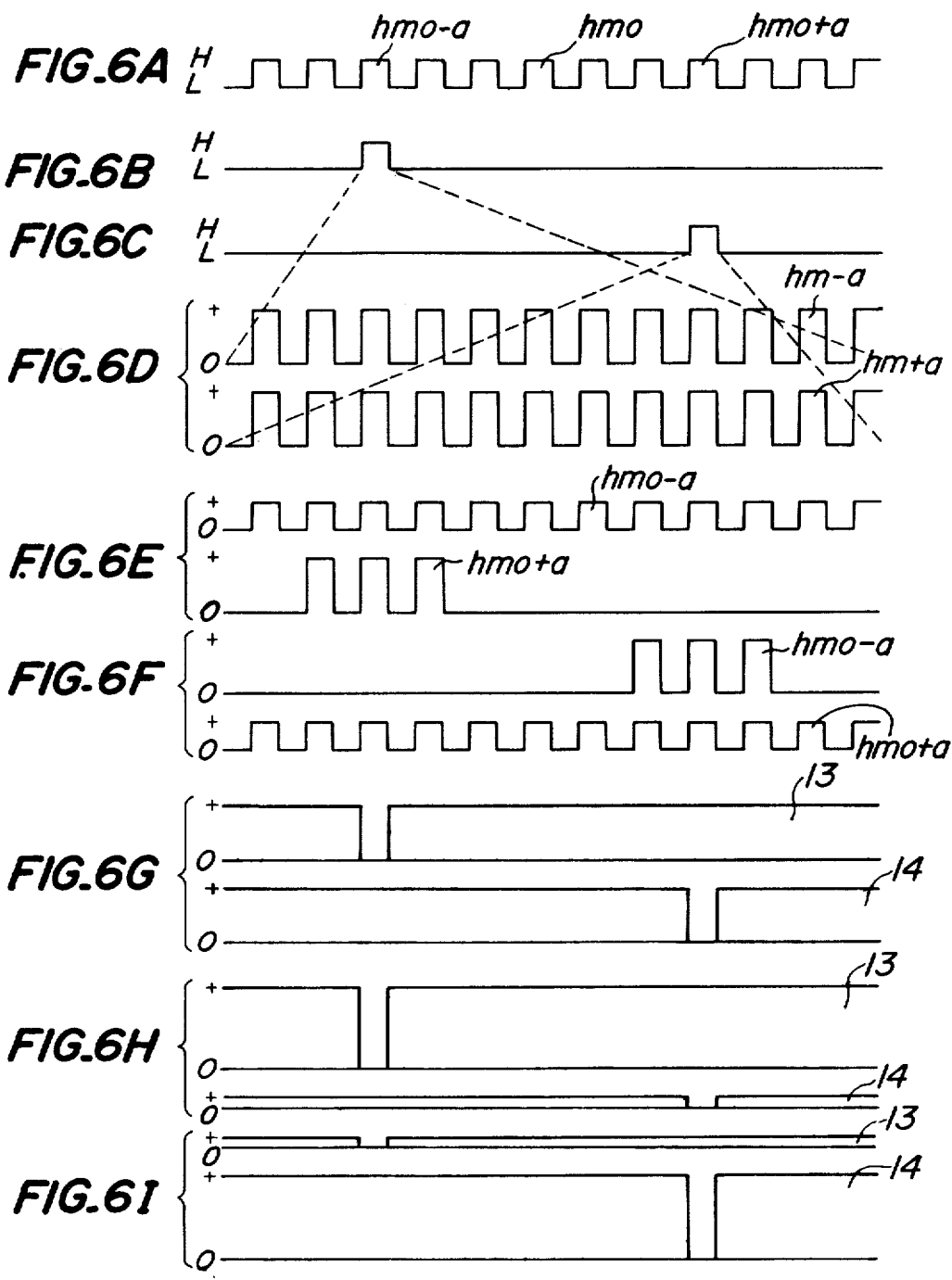

APPARATUS FOR DETECTING THE IN-FOCUSING CONDITIONS

BACKGROUND OF THE INVENTION

The present invention relates to an apparatus for detecting the in-focusing conditions used for an optical machinery such as cameras, microscopes, endoscopes and the like.

As one of the conventional apparatus for detecting the in-focusing conditions, photo-electro transducer elements such as CdS cell or the like are arranged in front and in the rear of an image surface of an optical system, illuminance signals from these two elements are compared with each other and an in-focusing position is detected. In this apparatus, however, when the optical system is at the in-focusing position, it is necessary to make levels of these illuminance signals of two photo-electro transducer elements equal, so that it is difficult to arrange these two elements in correct position, and a precision is worse since the illuminance signals are compared at a fixed position.

There is another apparatus for detecting the infocusing conditions which is so constructed that photoelectro transducer elements such as CdS cell or the like are arranged in front and in the rear of an image surface in the same manner as described above, images focused on these two elements are scanned by a rotary mirror, contrasts of images on these elements are sought and compared with each other, thereby to detect an in-focusing position. Even in this apparatus, however, when the optical system is at the infocusing position, it is necessary to arrange two elements so as to make respective contrasts of images on two photoelectro transducer elements equal to each other, so that it is also difficult to arrange these elements in correct position. Moreover, in order to seek the contrasts, it is necessary to obtain an illuminance signal of a picture element array by scanning an image formed on a plane orthogonal to an optical axis at an arranged position of respective photo-electro transducer elements on the light receiving surfaces of respective elements, so that a rotary mirror for scanning and its driving device are required, and thus, an apparatus itself becomes disadvantageously large as a whole.

A further apparatus is also proposed which is so constructed that a light receiver consisting of image sensors such as CCD (charge coupled device) or the like is provided on an image surface of an optical system, the values of a contrast evaluation function for the images focused on the light receiver are sought, and the thus obtained values are compared with each other in succession thereby to detect the in-focusing conditions. In this apparatus, however, in successive comparison of the values of the contrast evaluation function, the in-focusing position is detected by the change of a polarity of the result obtained by the comparison, so that the detected position of the in-focusing does not meet with the actual in-focusing position of the optical system and thus the precision becomes worse. In case of automatically moving and adjusting the optical system to an infocusing position based on the result of comparison, even if the direction of the deviation of the in-focusing position is found by a polarity of the result of comparison, an amount of the deviation cannot be found, so that its control becomes complicated and troublesome, and its response becomes also a problem.

SUMMARY OF THE INVENTION

An object of the present invention is to eliminate the above mentioned disadvantages of the conventional infocusing condition detecting apparatus.

Another object of the present invention is to provide an in-focusing condition detecting apparatus capable of detecting the in-focusing conditions with a high precision and having a small and simple construction.

According to the present invention an apparatus for detecting the in-focusing conditions comprises a light receiver arranged with an angle of inclination against an image surface of an optical system and consisting of a plurality of charge transfer elements aligned as a picture element array; means for driving illuminance signals from the picture element array of the light receiver and means for treating the illuminance signals to detect the in-focused position of the optical system.

An apparatus for detecting the in-focusing conditions comprises a light receiver arranged with an angle of inclination against an image surface of an optical system and consisting of a plurality of charge transfer elements aligned as a picture element array; means for selectively deriving illuminance signals of predetermined picture elements on both sides of the image surface of the light receiver; and means for treating the derived illuminance signals to detect the in-focused position of the optical system.

An apparatus for detecting the in-focusing conditions comprises a light receiver arranged with an angle of inclination against an image surface of an optical system and consisting of a plurality of charge transfer elements arranged in the form of a matrix of picture elements on both sides of a straight line orthogonal to an optical axis passed through the image surface; means for selectively deriving illuminance signals of a predetermined picture element column of the light receiver arranged in parallel to the straight line thereby to obtain signals for representing a size of an image focused on the picture element column; and means for treating the thus obtained signals to detect the in-focused position of the optical system.

BRIEF DESCRIPTION OF THE DRAWINGS

FIG. 4 is a schematic diagram showing one embodiment of an apparatus for detecting the in-focusing conditions according to the present invention;

FIG. 5 is a schematic diagram showing another embodiment of the apparatus according to the present invention;

FIGS. 6A to 6I are waveforms for explaining each operation of the apparatus shown in FIG. 5.

DETAILED DESCRIPTION OF THE INVENTION

Figure 1:
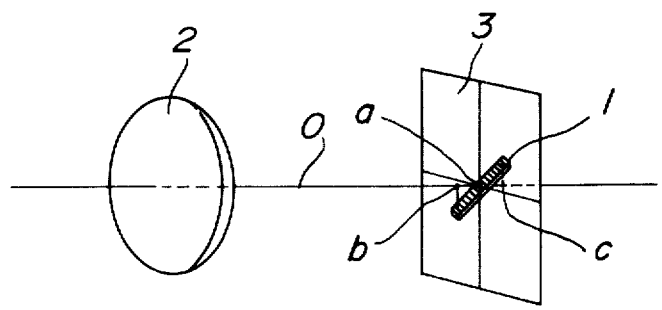
FIGS. 1 and 2 are perspective views showing embodiments of disposal positions of light receivers used for an apparatus for detecting the in-focusing conditions according to the present invention, respectively.

Referring now to the drawing two embodiments of an apparatus for detecting the in-focusing conditions according to the present invention.

Figure 2:
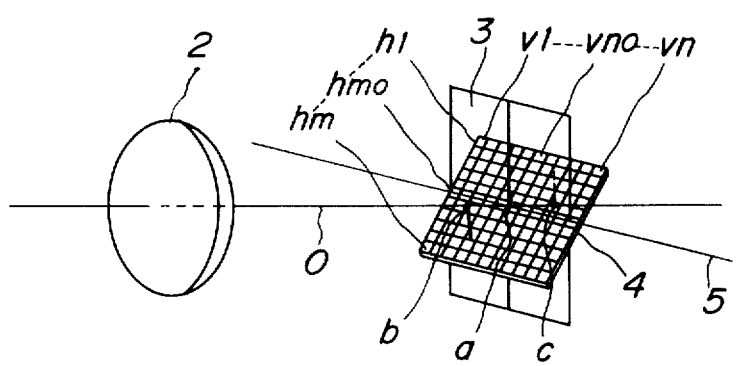

FIGS. 1 and 2 are perspective views showing respective disposal positions of light receivers used for an in-focusing condition detecting apparatus according to the present invention.

In FIG. 1, as a light receiver 1, use is made of an image sensor such as CCD (charge coupled device), BBD (bucket brigade device) or the like of a one-dimensional array made by arranging a plurality of photosensitive elements (hereinafter referred to as picture element) in one row. The light receiver 1 is inclined on an image surface 3 in such a manner that a picture element substantially located at the center of the light receiver 1 is passed through an optical axis 0 of an optical system 2 so as to detect the in-focus.

In FIG. 2, as a light receiver 4, use is made of an image sensor of a two-dimensional array made by arranging a large number of picture elements in the form of a matrix in rows hl-hm and columns vl-vn, and the light receiver 4 is inclined on the image surface 3 so as to make picture elements of the row hmo at almost center parallel to a straight line 5 orthogonal to the optical axis 0 on the image surface 3 of the optical system 2 and to pass the almost central picture element (hmo, vno) of the row hmo through the optical axis 0.

Figure 3:
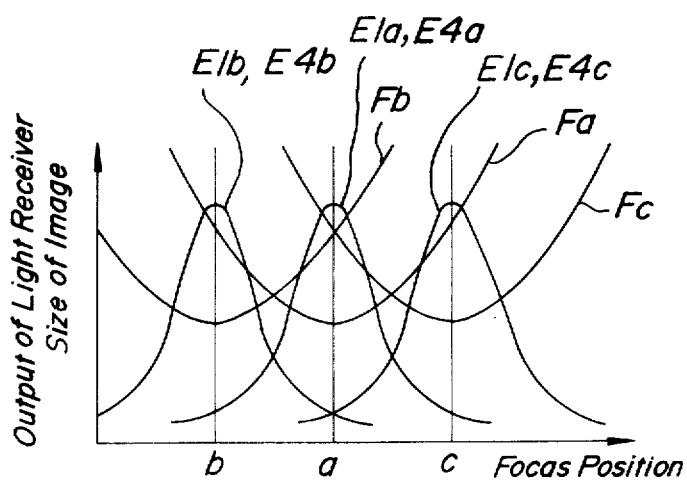
FIG. 3 is a schematic diagram showing the magnitude of a picture element signal and the size of an image by comparing the case when the optical system is at the in-focusing position with the case when the optical system is out of the in-focusing position in FIGS. 1 and 2.

According to the above arrangement, in FIGS. 1 and 2, when a focus of the optical system 2 is at a point a on the image surface 3, that is, the optical system 2 is at an in-focusing position, a focus is at a point b in front of the image surface 3, and a focus is at a point c at the rear of the image surface 3, outputs E1a, E1b, E1c of the picture elements in the light receiver 1 and outputs E4a, E4b, E4c of the picture elements at the column vno in the light receiver 4 are designated by curves shown in FIG. 3, respectively. In FIG. 2, the outputs having similar curves can be obtained in each column of the column vn.

Consequently, when the outputs successively obtained from the light receiver 1 or the outputs successively obtained from a predetermined column of the light receiver 4 are properly treated, an in-focus can easily be detected. In case of using the light receiver 4, as shown by curves Fa, Fb, Fc in FIG. 3, sizes of respective images are different in front and in the rear of focusing positions a, b, c, so that a signal or contrast representing the size of an image can be sought at the selected row, and thus the in-focusing position can be detected by comparison thereof.

FIG. 4 is a schematic diagram showing one embodiment of an apparatus for detecting the in-focusing conditions according to the present invention. In the present embodiment, among illuminance signals successively obtained from the light receiver 1 shown in FIG. 1, illuminance signals of two picture elements on both sides of the optical axis are selectively extracted, and the optical system 2 is automatically moved and adjusted to an in-focusing position based on the comparison of respective illuminance signals. A clock signal generator circuit 7 receives an output from an oscillator 8 and supplies a predetermined clock pulse to a synchronizing signal generator circuit 9. The light receiver 1 is driven by the clock pulse from the clock signal generator circuit 7 and supplies illuminance signals of each picture element to a preamplifier 10 in succession. The preamplifier 10 amplifies an illuminance signal from the light receiver 1 and supplies its output to analog switches 11 and 12. The analog switches 11 and 12 are controlled by a predetermined drive pulse from the synchronizing signal generator circuit 9 and supply an output signal of the preamplifier 10 at the time of receiving the drive pulse to hold circuits 13 and 14, respectively. In addition, the drive pulse generated in the synchronizing signal generator circuit 9 designates its position (address) in order to extract the signals corresponding to the outputs of the picture elements selected on both sides of the optical axis in the light receiver 1. The hold circuits 13 and 14, therefore, hold signals corresponding to the outputs of the predetermined picture elements on both sides of the optical axis in the light receiver 1, respectively. A differential servo-amplifier 15 compares the signals held by the hold circuits 13 and 14, moves the optical system 2 to the direction of the optical axis by driving a motor 16 in accordance with the difference by the comparison, and servo-controls the focus of the optical system 2 so as to come onto the image surface. That is, in case of comparing the illuminance signals of the picture elements on both sides at a distance equal to the picture elements passed through the optical axis, if the optical system 2 is moved and adjusted to the position where the output of the differential servo-amplifier 15 becomes zero, it means that the optical system 2 is at the position of the in-focusing condition.

FIG. 5 is a schematic diagram showing another embodiment of an apparatus for detecting the in-focusing conditions according to the present invention. In the present embodiment, among the illuminance signals successively obtained from the light receiver 4 in FIG. 2, two picture element rows on both sides of the row hmo are selected, respectively, the illuminance signals from these rows are processed, signals representing size of images at respective rows are obtained, and the optical system 2 is automatically moved and adjusted to an in-focusing position based on the comparison of the signals representing sizes of these two images. In FIG. 5, like numerals are used as in FIG. 4. Thus, in order to obtain the signals representing the size of images in the selected two rows, in the present embodiment, the output of the preamplifier 10 is compared with a reference value Vs by a comparator 20, the outputs of an amplitude having a value more than the predetermined reference value are made as the outputs having a certain amplitude, the outputs of the picture element arrays in each of the selected rows are supplied to integrating circuits 21 and 22 through the analog switches 11 and 12, a total sum of the outputs from the column vl to the column vn at each of the selected rows, i.e., a signal in proportion to the total sum of the number of picture elements which generate the outputs having a value more than the predetermined reference value at each row, is sought, and these values are compared at the differential servo-amplifier 15 through the hold circuits 13 and 14.

The operation of the apparatus shown in FIG. 5 will be explained in greater detail with reference to waveforms shown in FIG. 6. The light receiver 4 is scanned from the row hl to the row hm in order at each column from the column vl to the column vn in order, and the selected two rows are of rows hmo−a and hmo+a at the position apart from the distance equal to the row hmo. The light receiver 4 is scanned from the column vl to the column vn in order by a clock pulse shown in FIG. 6A. The synchronizing signal generator circuit 9 repeatedly supplies gate pulses shown in FIGS. 6B and 6C to the analog switches 11 and 12 every column for the purpose of supplying the outputs of the comparator 20 corresponding to the rows hmo−a and hmo+a to the integrating circuits 21 and 22 at each of the column vl-vn. Then, to the integrating circuits 21 and 22 are supplied signals of picture elements of the rows hmo−a and hmo+a, respectively.

For example, when the focus of the optical system 2 is formed on the image surface, that is, the optical system 2 is in the in-focusing condition, the focus is in front of the image surface and the focus is in the rear of the image surface, if the signals of the picture elements of the rows hmo−a and hmo+a of the light receiver 4 are shown, every case becomes as shown in FIGS. 6D, 6E and 6F. In each case, therefore, integrated values of the signals of the rows hmo−a and hmo+a generated from the hold circuits 13 and 14 become those shown in FIGS. 6G, 6H and 6I, respectively. That is, in the in-focusing condition (FIG. 6D), the outputs of the hold circuits 13 and 14 are equal to each other, so that the output of the differential servo-amplifier 15 becomes zero and the optical system 2 maintains its in-focusing condition. Further, in the front focused condition (FIG. 6E), the number of picture elements which generate illuminance signals having an amplitude of more than a predetermined amplitude in the row hmo−a becomes much more than the number of picture elements which generate illuminance signals having an amplitude of more than a predetermined amplitude in the row hmo+a, so that the output of the hold circuit 13 becomes far larger than that of the hold circuit 14. Accordingly, the output of the differential servo-amplifier 15 becomes negative polarity, thereby to move and control the optical system 2 close to the image surface. In the rear focused condition (FIG. 6F), contrary to the above-described front focused condition, the output of the differential servo-amplifier 15 becomes positive polarity, so that the optical system 2 is moved and controlled to separate from the image surface.

Figure 7A:
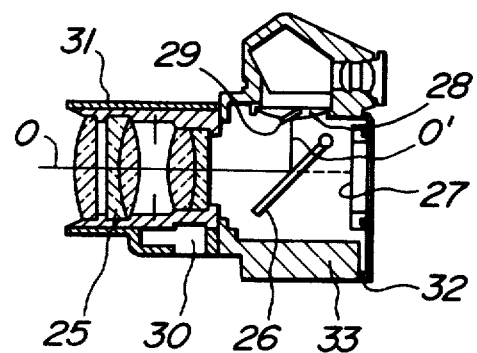
FIGS. 7A and 7B are cross-sectional views showing two embodiments of a single-lens reflex camera provided with an apparatus for detecting the in-focusing conditions according to the present invention, respectively.
Figure 7B:
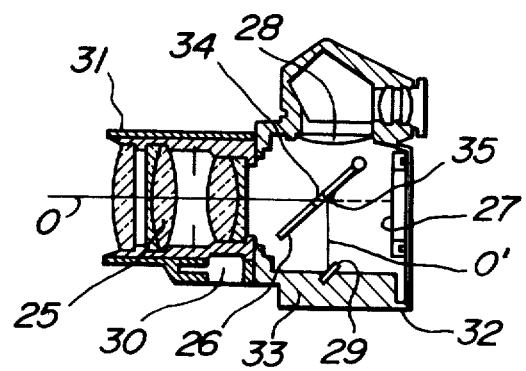

FIGS. 7A and 7B are cross-sectional views showing two embodiments of a single-lens reflex camera comprising an apparatus for detecting the in-focusing conditions according to the invention, respectively. FIG. 7A shows such a construction that a light receiver 29 consisting of image sensors of one-dimensional or two-dimensional arrays constructed so as to pass through an imaginary axis 0' of a reflected pencile of rays is arranged on a reticle 28 provided at the position conjugated with a film surface 27 at the position to form an image by reflecting a pencil of rays converged by a camera lens optical system 25 by a quick return mirror 26 provided at an angle of 45° to an optical axis 0, at an angle of inclination against the image surface of the reticle 28, illuminance signals obtained from the light receiver 29 are processed by a signal treating circuit shown in FIG. 4 or 5, a motor 30 is driven by the treated signal, the camera lens optical system 25 is moved in the direction of the optical axis 0 in a lens-barrel 31, thereby to automatically move and adjust the camera lens optical system 25 to the in-focusing position. The signal treating circuit shown in FIG. 4 or 5 can be arranged at base portion 33 of a camera body 22. FIG. 7B shows such a construction that a light transmitting portion 34 is provided at the center of the quick return mirror 26 inclusive of the optical axis 0 of the camera lens optical system 25, the pencil of rays transmitted through the portion 34 is reflected in the direction of the base portion 33 of the camera body 32 by a reflecting mirror 35 provided to the quick return mirror 26, and the reflected pencil of rays is imaged on the light receiver 29 arranged in the same manner as in FIG. 7A on the base portion 33.

As apparent from the above, according to the present invention, a light receiver consisting of charge transfer elements arranged in a picture element array, for example, image sensors such as CCD (charge coupled device), BBD (bucket brigade device) or the like is obliquely arranged on an image surface, so that its arrangement is simple, while it is possible to obtain illuminance signals of the picture element array at any optional position on, in front and in the rear of the image surface, so that when the illuminance signals are properly treated, it becomes possible to detect the in-focus with high precision. In case of detecting the in-focus by detecting the contrast or size of an image, if use is made of a light receiver formed by arranging photosensitive elements in the form of a matrix, the image formed on, in front or in the rear of the image surface can be scanned without using any rotary mirror.

The present invention is not limited to the above embodiments, but various alternations or modifications can be possible. For example, in FIGS. 4 and 5, as the optical system 2 becomes close to the in-focusing position, the illuminance level of the picture element in the vicinity of the image surface becomes large, so that if respective illuminance signals and its integrating values obtained from the picture elements or its array on both sides of the image surface at the position apart therefrom to the picture elements or its array on both sides of the image surface at the vicinity thereof are successively or selectively compared with each other and the in-focus is detected, a signal having a large level can be treated as close to the in-focus, and thus, the in-focus with high precision can be detected. It can easily be attained by suitably changing timing of the drive pulse (gate pulse) generated from the synchronizing signal generator circuit 9. Further, the in-focusing position of the optical system 2 can be detected by not only comparing the picture element and the picture element row positioned on both sides of the image surface, but also comparing the picture element and the picture element row on the image surface with the picture element and the picture element row positioned on both sides of the image surface, and the in-focus can also be detected by comparing the picture element and the picture element row on the image surface with a predetermined picture element and picture element row on one side of the image surface. Further, in FIG. 4, as the light receiver 1, use is made of a two-dimensional array shown in FIG. 2, and in this case, not the picture element by every one on both sides of the image surface but a plurality of picture elements are designated so as to detect the in-focus. Further, in the above-described embodiments, the optical system 2 is automatically moved and adjusted to the in-focusing position based on the output of the differential servo-amplifier 16, but with the use of a comparator instead of the differential servo-amplifier 16, in the process of manually moving the optical system 2, when the optical system comes to the in-focusing position, a light emitting diode is lighted by the output of the comparator, or a sound is generated by driving a buzzer. Further, in the above embodiments, the optical axis 0 of the optical system 2 passes through substantially the center of the light receivers 1 and 4, but the light receivers 1 and 4 are not necessarily crossed with the optical axis 0 but inclined by crossing with the image surface thereon.

What is claimed:

1. An apparatus for detecting the in-focusing conditions comprising a light receiver arranged with an angle of inclination against an image surface of an optical system and consisting of a plurality of charge transfer elements aligned as a picture element array; means for deriving illuminance signals from the picture element array of the light receiver and means for treating the illuminance signals to detect the in-focused position of the optical system.

2. An apparatus for detecting the in-focusing conditions comprising a light receiver arranged with an angle of inclination against an image surface of an optical system and consisting of a plurality of charge transfer elements aligned as a picture element array; means for selectively deriving illuminance signals of predetermined picture elements on both sides of the image surface of the light receiver; and means for treating the derived illuminance signals to detect the in-focused position of the optical system.

3. An apparatus for detecting the in-focusing conditions comprising a light receiver arranged with an angle of inclination against an image surface of an optical system and consisting of a plurality of charge transfer elements arranged in the form of a matrix of picture elements on both sides of a straight line orthogonal to an optical axis passed through the image surface; means for selectively deriving illuminance signals of a predetermined picture element column of the light receiver arranged in parallel to the straight line thereby to obtain signals for representing a size of an image focused on the picture element column; and means for treating the thus obtained signals to detect the in-focused position of the optical system.

* * * * *